United States Patent
Ruppaner

(10) Patent No.: US 9,165,207 B2
(45) Date of Patent: Oct. 20, 2015

(54) SCREENSHOT ORIENTATION DETECTION

(71) Applicant: Google Inc., Mountain View, CA (US)

(72) Inventor: Maximilian Ruppaner, London (GB)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 13/776,177

(22) Filed: Feb. 25, 2013

(65) Prior Publication Data

US 2014/0241635 A1 Aug. 28, 2014

(51) Int. Cl.
*G06K 9/46* (2006.01)
*G06K 9/00* (2006.01)
*G06K 9/32* (2006.01)

(52) U.S. Cl.
CPC .............. *G06K 9/46* (2013.01); *G06K 9/00228* (2013.01); *G06K 9/3208* (2013.01)

(58) Field of Classification Search
USPC .......................................................... 382/197
See application file for complete search history.

(56) References Cited

U.S. PATENT DOCUMENTS

| | | | |
|---|---|---|---|
| 5,235,651 A * | 8/1993 | Nafarieh | 382/290 |
| 5,383,754 A | 1/1995 | Sumida et al. | |
| 6,466,336 B1 | 10/2002 | Sturgeon et al. | |
| 6,567,628 B1 | 5/2003 | Guillemin et al. | |
| 7,706,579 B2 * | 4/2010 | Oijer | 382/118 |
| 2003/0086721 A1 * | 5/2003 | Guillemin et al. | 399/82 |
| 2006/0204110 A1 | 9/2006 | Steinberg et al. | |
| 2011/0258150 A1 | 10/2011 | Neogi et al. | |
| 2012/0105918 A1 | 5/2012 | Fan et al. | |

OTHER PUBLICATIONS

International Search Report in PCT/US2014/018011 mailed Jul. 8, 2014.

* cited by examiner

*Primary Examiner* — Siamak Harandi
(74) *Attorney, Agent, or Firm* — Morris & Kamlay LLP

(57) ABSTRACT

A method and/or system for screenshot orientation detection may include performing an initial optical character recognition (OCR) and/or an initial face recognition technique on a screenshot of an application. A determination of whether the screenshot orientation is correct may be made based on, for example, the initial OCR and/or the initial face recognition technique. In an event when the screenshot orientation is not correct, a determination of a correct screenshot orientation may be made. In this regard, the screenshot may be rotated (e.g., by a predetermined number of degrees). A subsequent OCR and/or a subsequent face recognition technique may be performed on the rotated screenshot. A determination may be made whether the screenshot orientation of the rotated screenshot is correct based on, for example, the subsequent OCR and/or the subsequent face recognition technique.

16 Claims, 5 Drawing Sheets

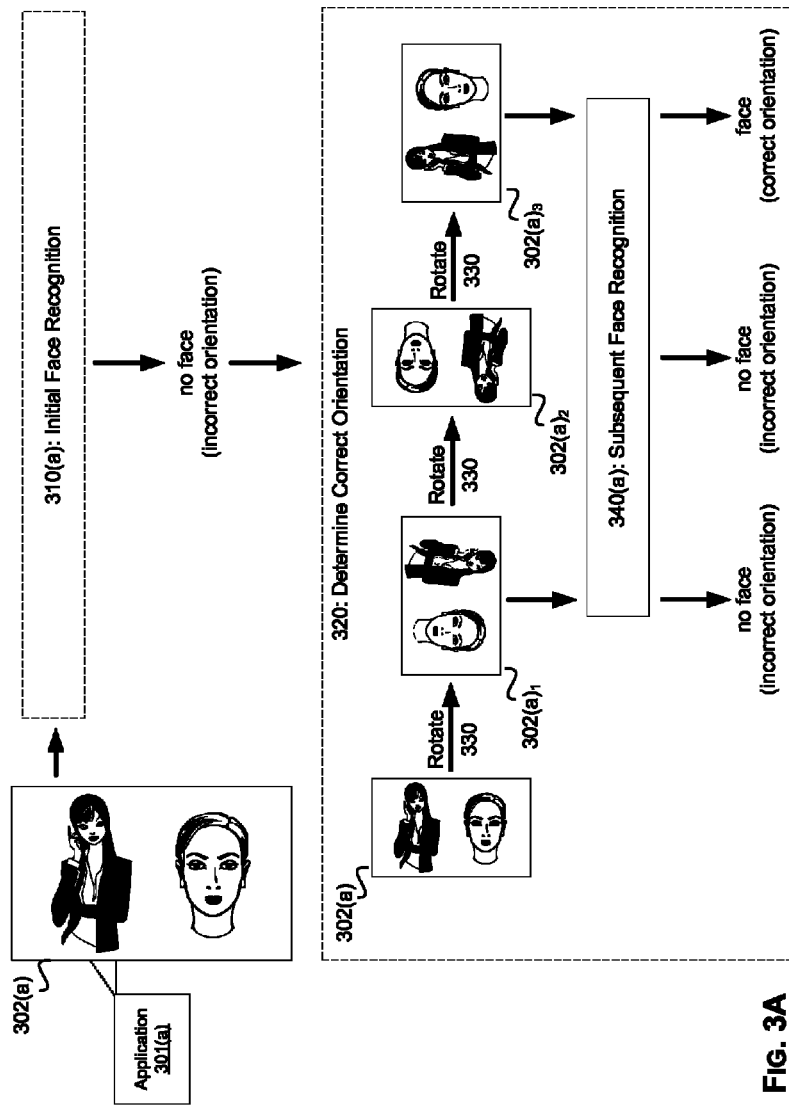

SCREENSHOT ORIENTATION DETECTION

TECHNICAL FIELD

Aspects of the present application relate to verifying mobile applications. More specifically, certain implementations of the present disclosure relate to a method and/or system for screenshot orientation detection.

BACKGROUND

Various types of electronic devices are now commonly utilized. In this regard, electronic devices may include, for example, personal and non-personal devices, mobile and non-mobile devices, communication (wired and/or wireless) devices, general and special purpose devices. Examples of electronic devices may comprise cellular phones, smartphones, tablets, personal computers, laptops and the like. As the use of electronic devices increases, the consumption of electronic device applications also increases. User experience with the applications may be inhibited by careless release of applications to application stores.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for screenshot orientation detection, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

FIG. 3A and FIG. 3B are block diagrams of an example process of screenshot orientation detection, in accordance with an example embodiment of the disclosure.

DETAILED DESCRIPTION

Certain embodiments of the disclosure may be found in a method and/or system for screenshot orientation detection. In various embodiments of the disclosure, a method and/or system for screenshot orientation detection may include performing an initial image processing technique (e.g., an initial optical character recognition (OCR), an initial face recognition technique, etc.) on a screenshot of an application, where the screenshot comprises a screenshot orientation. A determination of whether the screenshot orientation is correct may be made based on, for example, the initial image processing technique (e.g., the initial OCR, the initial face recognition technique, etc.). In an event when the screenshot orientation is not correct, a determination of a correct screenshot orientation may be made. In this regard, the screenshot may be rotated by, for example, a predetermined number of degrees. A subsequent image processing technique (e.g., subsequent OCR, subsequent face recognition technique, etc.) may be performed on the rotated screenshot. A determination may be made whether the screenshot orientation of the rotated screenshot is correct based on, for example, the subsequent image processing technique (e.g., the subsequent OCR, the subsequent face recognition technique, etc.).

In an example embodiment of the disclosure, a notification to a developer entity associated with the application may be sent. The notification may be indicative of, for example, whether the screenshot orientation is correct. The notification may include an option for the developer entity to select the correct screenshot orientation for the application.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "block" refers to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

Figure 1:
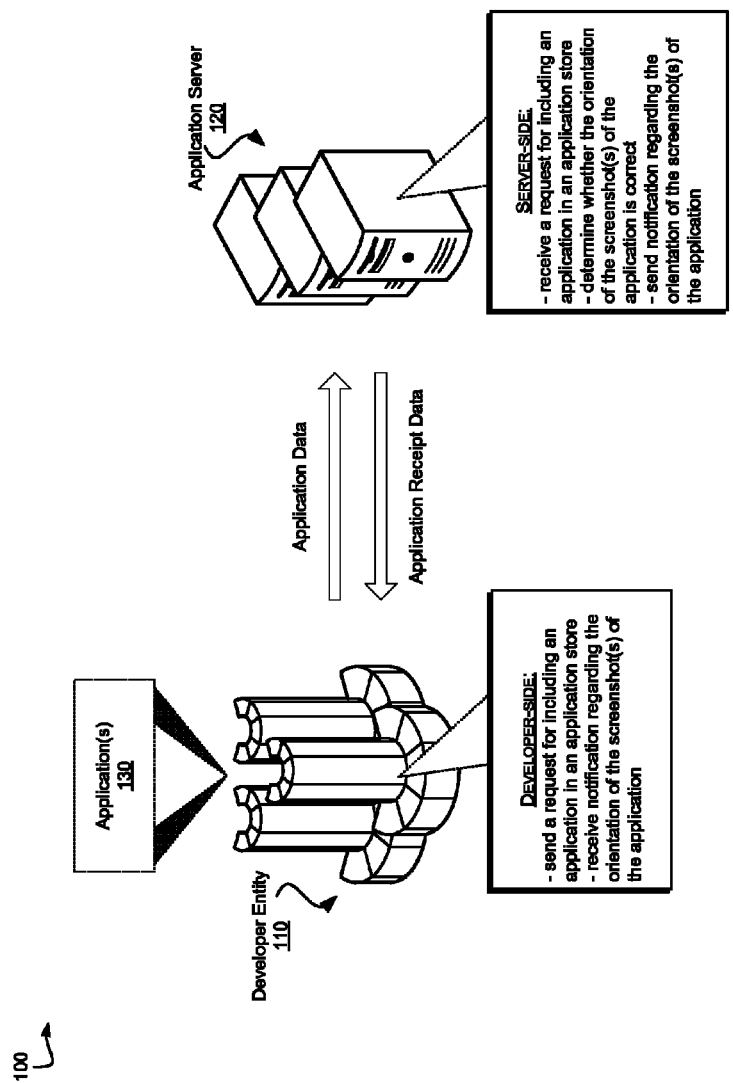
FIG. 1 is a block diagram of an example system for screenshot orientation detection, in accordance with an example embodiment of the disclosure.

FIG. 1 is a block diagram of an example system for screenshot orientation detection, in accordance with an example embodiment of the disclosure. Referring to FIG. 1, there is shown a system for screenshot orientation detection 100. The system 100 may comprise a developer entity 110 and/or an application server 120.

A developer entity 110 may comprise suitable logic, circuitry, interfaces, and/or code that may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC). The developer entity 110 may be operable to process, generate, present and/or output data and/or messages. The developer entity 110 may be enabled to perform, run, and/or execute various functions, operations, applications and/or programs based on, for example, user instructions and/or interactions, and/or pre-configured instructions. In this regard, the developer entity 110 may be operable to communicate, for example, with the application server 120.

In an example embodiment of the disclosure, the developer entity 110 may be operable to communicate with the application server 120 through an application programming interface (API). In another example embodiment of the disclosure, the developer entity 110 may communicate with the application server via an on-line (e.g., web browser) interface. The API and/or the web interface may be provided and/or supported by an application server, such as, for example, the application server 120. In this regard, the developer entity 110 may be operable to automatically and/or in response to a user interaction send, utilizing the API and/or the web interface, a request to the application server 120, for the application server 120 to approve an application, such as, for example, the application 130, for including in application store. The disclosure, and/or any implementation(s) in accordance therewith are not limited to any particular type of a communication interface.

The developer entity 110 may be operable to create, develop, program, store and/or manage applications, such as, for example, the application(s) 130. The Application(s) 130 may comprise, for example, various programs and/or applications intended to be installed, accessed and/or otherwise operable for use on an electronic device, such as, for example, a cellular phone, smartphone, tablet, set-top box, television, laptop computer, desktop and/or personal computer, personal media player and/or other device which may communicate, process, generate, present and/or output data. The applications may comprise for example, games, business applications (e.g., word processing, corporate e-mail access), personal applications (e.g., e-mail, web browsing, personal diary), social networking application and other applications that may be intended for use on an electronic device.

In an example embodiment of the disclosure, the developer entity 110 may send, to an application server, such as, for example, the application server 120, a request comprising application data and/or the application(s) 130 for an approval of the application(s) 130 by the application server 120 for release in an application store. The application store may be supported and/or managed by, for example, the application server 120. In an example embodiment of the disclosure, the application store may be an application store accessible through an electronic device (e.g., through an application store application, applications store web application, etc.) that may be operable to provide a user of the electronic device with an option to browse, download and/or purchase various applications, such as, for example, the application(s) 130.

The application server 120 may comprise suitable logic, circuitry, interfaces, and/or code that may be operable to provide application approval services to developer entities, such as for example, the developer entity 110. For example the application server 120 may be enabled to provide application acceptance, screening (e.g., screenshot orientation detection, etc.), processing, management and/or upsell (e.g., providing purchasing options to users of electronic devices for purchasing applications submitted by the developer entity 110, etc.). The application server 120 may also be operable to provide services related to an application store, such as, for example, managing applications in an application store for advertising and/or sale to users of electronic devices. The application server 120 may comprise a dedicated system and/or a general purpose system configured to provide application approval services (e.g., application screenshot detection) to developer entities, such as, for example, the developer entity 110. The application server 120 may, for example, comprise the application server 200 as depicted in and/or described with respect to FIG. 2. The disclosure, and/or any implementation(s) in accordance therewith, however, are not limited to any particular type of an application server.

The application server 120 may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC) with developer entities, such as, for example, the developer entity 110. The application server 120 may be enabled to process, store, manage and/or communicate data and/or messages relevant to providing application approval and/or management services to developer entities, such as, for example, the developer entity 110. Furthermore, the application server 120 may be operable to provide communication services to and from the developer entity 110. For example, the application server 120 may include one or more transceivers for providing wired and/or wireless communication of data to and from developer entities, such as, for example, the developer entity 110.

In operation, a developer entity, such as, for example, the developer entity 110 may send, to an application server, such as, for example, the application server 120, a request for an approval of an application, such as, for example, application 130. In this regard, the request may comprise application data (e.g., developer data, version, application category, executable instructions, application screenshots, etc.). The application server 120 may, based on, for example, the request, determine whether the application 130 may be released to an application store. For example, the application server 120 may determine whether the request comprises one or more application screenshots.

The application server 120 may determine whether one or more of the application screenshots have a correct orientation. In this regard, the applications server 120 may perform a variety of image processing techniques (e.g., image composition deviation, optical character recognition (OCR), facial recognition, visual search, etc.).

In an example embodiment of the disclosure, the application server 120 may automatically adjust an incorrect screenshot orientation and may send to the developer entity application receipt data. The application receipt data may, for example, comprise data and/or information notifying the developer entity 110 of the adjustment. The notification may comprise an option to reverse the adjustment.

In another example embodiment of the disclosure, the application server 120 may not automatically adjust an incorrect screenshot orientation and may send, to the developer entity 110, application receipt data. The application receipt data may, for example, comprise data and/or information indicating whether each of the one or more application screenshots has a correct orientation.

In an example embodiment of the disclosure, an approval of the application 130 for release in an application store may or may not be conditional on a correct orientation of the one or more screenshots of the application 130. For example, the application 130 may not be approved for release if one or more screenshots of the application 130 has an incorrect orientation. In another example, the application 130 may be approved for release even if one or more screenshots of the application 130 has an incorrect orientation. In either case, the application server 120 may send a notification, for example as part of the application receipt data, to the developer entity 110 associated with that application 130. In this regard, the notification may comprise data and/or information indicative of the determined incorrect screenshot orientation. The notification may further comprise, for example, an option (and/or instructions) to automatically and/or manually correct the determined incorrect screenshot orientation.

In an example embodiment of the disclosure, an example automatic option to correct the determined incorrect screenshot orientation may be associated with, for example, providing an automated method for the developer entity 110 to send to the application server 120 a request to automatically correct the incorrect screenshot orientation. For example, the application server 120 may send to the developer entity 110 a message including, for example, a hyperlink and/or any other method that may allow the developer entity 110 associated with the application 130 to send a request to the application server 120 to automatically correct the determined incorrect screenshot orientation.

In an example embodiment of the disclosure the message may be an e-mail message. The e-mail message may comprise, for example, a graphical representation (e.g., an image) of the determined incorrect screenshot and/or a graphical representation (e.g., an image) of a suggested correct screenshot orientation. The e-mail message may provide an option to the developer entity 110 to respond to the screenshot orientation determination. In an example embodiment of the disclosure, the option may be an option to automatically correct the orientation of the screenshot from the determined incorrect orientation to the suggested correct orientation. In another example embodiment of the disclosure, the option may be an option to reject the suggested corrected orientation when, for example, the suggested corrected orientation is incorrect (e.g. the determined incorrect orientation is instead correct or another orientation may be correct).

The option may be in a form of, for example, a hyperlink, a shortcut and any other method that would facilitate an automated (e.g., without custom user input) communication between the developer entity 110 and the application server 120. For example, if the option is a form of a hyperlink, the developer entity 110 may process the hyper link (e.g., automatically though an API that may allow communication between the developer entity 110 and the application server 120, manually though a user interaction—selecting and/or interacting with the hyperlink, etc.). The processing of the hyperlink may cause the developer entity 110 to send, to the application server 120, a message, such as, for example, an automatically generated e-mail and/or any other communication that may be received and/or processed by the application server 120.

In another example embodiment of the disclosure, the option may be in a form of a text communication. For example, the text communication may direct the developer entity 110 to, for example, log into a developer account associated with the developer entity 110. It is to be understood that the text communication may also include, for example, an option to automatically log into the developer account by, for example, opening a developer interface (e.g., a web browser interface, etc.) and/or re-directing to a developer interface that may provide an option, for the developer entity 110, to respond to the screenshot orientation determination.

In an example embodiment of the disclosure, the application server 120 may provide and/or manage developer registration and/or authentication services. A developer entity, such as, for example the developer entity 110 may register with the registration/authentication services provided by the application server 120, by for example creating a developer account. The registration services may provide, for example, for a graphical user interface (GUI), where a user associated with the developer entity 110 may initiate a registration process for the developer entity 110.

In an example embodiment of the disclosure, the registration of the developer entity 110 may comprise registering one or more application entities under the developer account. For example, if a developer entity 110 is associated with a company with one or more application development departments, one or more application entities may become registered under the develop account, and each of the one or more application entities may correspond to a different application development department, associated with the same developer entity 110. Moreover, separate login (e.g., user name and password combination, etc.) may or may not be provided for one or more of the one or more application entities.

In an example embodiment of the disclosure, the application server 120 may provide developer authentication services. For example, during an application approval process, the application server 120 may provide a prompt to a user associated with the developer entity 110 for authentication data and/or information. The developer entity 110 (e.g., in response to user input and/or a predefine criteria) may send the authentication data and/or information to the application server 120 for authenticating the developer entity 110.

In an example embodiment of the disclosure, the application server 120 may automatically authenticate the developer entity 110 when, for example the developer entity 110 itself (e.g., without a user's intervention) or through a user associated with the developer entity 110 sends a request to the application server 120 for the application server 120 to approve an application for including in an application store. In this regard, when the application server 120 receives the request, the application server 120 may verify the identity of the developer entity 110. For example, the application server 120 may initiate and/or perform a search on a developer database to determine whether the developer entity 110 corresponds to a particular developer entity and authenticate the particular developer entity based on the correspondence.

Figure 2:
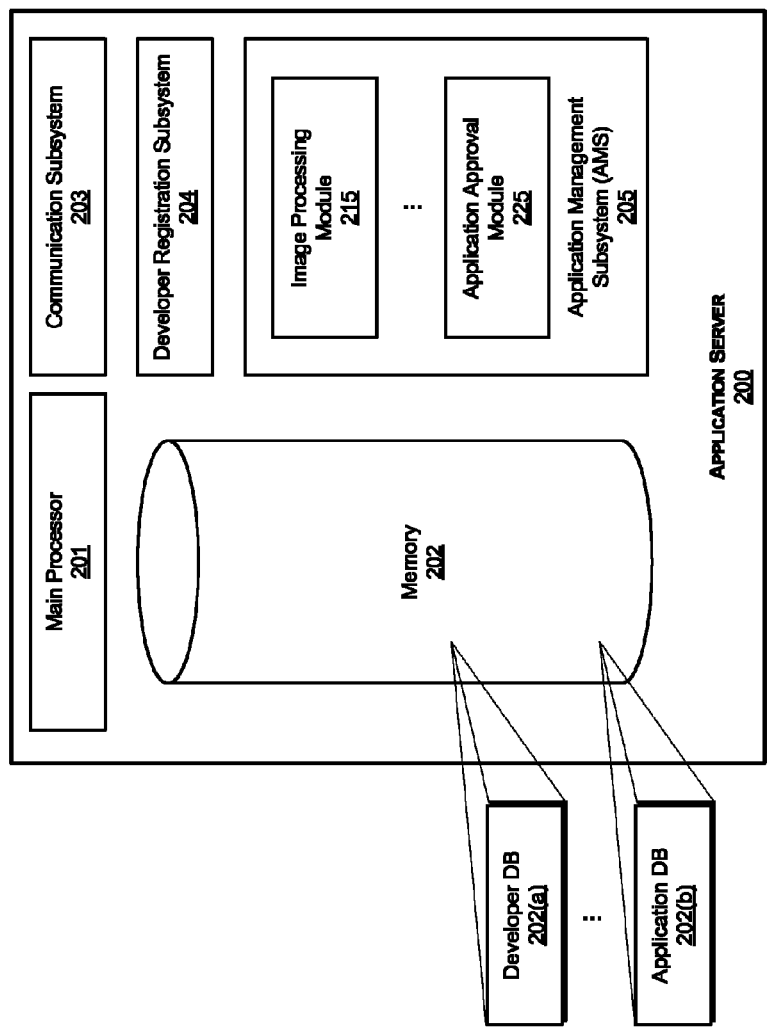
FIG. 2 is a block diagram of example application server that supports screenshot orientation detection, in accordance with an example embodiment of the disclosure.

FIG. 2 is a block diagram of example application server that supports screenshot orientation detection, in accordance with an example embodiment of the disclosure. Referring to FIG. 2, there is shown an application server 200.

The application server 200 may comprise suitable logic, circuitry, code, and/or interfaces that may be operable to implement various aspects of the disclosure. In this regard, the application server 200 may correspond to the application server 120 of FIG. 1. The application server 200 may, for example, comprise a main processor 201, a memory 202, a communication subsystem 203, a developer registration subsystem 204, and/or an application management subsystem (AMS) 205.

The main processor 201 may comprise suitable circuitry, interfaces, logic, and/or code that may be operable to process data, and/or control and/or manage components, operations and/or functions of the application server 200, and/or tasks performed therein. In this regard, the main processor 201 may configure and/or control operations of various components and/or subsystems of the application server 200, such as, for example, the memory 202, the communication subsystem 203, the developer registration subsystem 204, and/or the AMS 205, by utilizing, one or more control signals.

The memory 202 may comprise suitable logic, circuitry, interfaces, and/or code that that may be operable to enable permanent and/or non-permanent storage, buffering, and/or fetching of data, code and/or other information, which may be used, consumed, and/or processed by the components of the application server 200. In this regard, the memory 202 may be enabled to store executable instructions to manage and/or configure, for example, the main processor 201, the communication subsystem 203, the developer registration subsystem 204, and/or the AMS 205. The memory 202 may store, for example, configuration data, which may comprise parameters and/or code, comprising software and/or firmware. The memory 202 may comprise different memory technologies, including, for example, read-only memory (ROM), random access memory (RAM), low latency nonvolatile memory, flash memory, solid-state drive (SSD), field-programmable gate array (FPGA), and/or other suitable electronic data storage capable of storing data, code and/or other information.

The memory 202 may comprise one or more databases such, as for example, a developer registration database 202(*a*) and/or an application database 202(*b*).

The developer registration database 202(a) may comprise a plurality of entities each corresponding to a particular developer entity that may be associated with, for example, an individual and/or a company that may develop applications that may be accepted, screened, processed, managed and/or upsold to users of electronic services by, for example, the application server 200. In this regard, each entity may comprise information and/or data, such as, for example, developer account user name, developer account password, developer e-mail address, developer category (e.g., developer of games, business, personal, social and/or networking applications, etc.), application entity/entities that may be associated with the developer entity. In an example embodiment of the disclosure, a developer entity may correspond to one or more application entities (e.g., one or more application entities may correspond to a developer entity). In this regard, each of the one or more application entities may correspond to, for example, a different application development department that may be associated with developing particular type(s) of applications, such as, for example, games, business applications, personal, social networking applications, etc.

The application database 202(b) may comprise a plurality of entities each corresponding to an application that may be developed by, for example, a developer entity, and/or submitted to the application server 200 for acceptance, screening (e.g., determining screenshot orientation, etc.), processing, managing and/or upselling (e.g., providing purchasing options to users of electronic devices for purchasing applications submitted by a developer entity to the application server 200). The entities in the events database 202(b) may be stored and/or retrieved based on, for example, an application name, application type (e.g., game, business application, personal application, social networking application, etc.), a developer entity associated with the application.

The communication subsystem 203 may comprise suitable logic, circuitry, interfaces, and/or code that may be operable to communicate data from and/or to the application server 200, such as via one or more wired and/or wireless connections. For example, the communication subsystem 203 may comprise one or more transceivers for providing wired and/or wireless communication of data. The communication subsystem 203 may be configured to support one or more wired and/or wireless protocols, standards and/or interfaces (e.g., Ethernet, Bluetooth, WiFi, satellite and/or cellular network, WiMAX, WLAN, NFC) facilitating transmission and/or reception of signals to and/or from the application server 200, and/or processing of transmitted or received signals in accordance with applicable wired or wireless protocols. In this regard, signal-processing operations may comprise filtering, amplification, analog-to-digital conversion and/or digital-to-analog conversion, up-conversion/down-conversion of baseband signals, encoding/decoding, encryption/decryption, and/or modulation/demodulation.

The developer registration subsystem 204 may comprise suitable logic, circuitry, interfaces, and/or code that may be operable to communicate, process and/or manage developer registration and/or authentication requests and/or developer entity registration and/or authentication requests. In this regard, the developer registration subsystem 204 may be operable to manage developer accounts (e.g., create and/or store new developer accounts, access, store, update, modify and/or mange existing developer accounts). The developer registration subsystem 204 may access, manage and/or process data in a developer database, such as, for example, the developer database 202(a). For example, upon receiving a request to create a new developer account, the developer registration subsystem 204 may create a data entity in the developer database 202(a).

The AMS 205 may comprise suitable logic, circuitry, interfaces, and/or code that may be operable to accept, screen (e.g., determine screenshot orientation, etc.), process, manage and/or upsell (e.g., provide purchasing options to users of electronic devices for purchasing applications submitted by a developer entity to the application server 200). The AMS 205 may comprise an image processing module 215 and/or an application approval module 225.

The image processing module 215 may comprise suitable logic, circuitry, code, and/or interfaces that may be operable to provide image processing services. For example, the image processing module 205 may perform a variety of image processing techniques (e.g., image composition deviation, optical character recognition (OCR), facial recognition, visual search, etc.) on, for example, a screenshot of an application submitted by a developer entity to the applications server 120.

The application approval module 225 may comprise suitable logic, circuitry, code, and/or interfaces that may be operable to provide application approval services (e.g., an approval for release in an application store). For example, the application approval module 225 may receive and/or process application(s) and/or application data from a developer entity. In this regard, the application approval module 225 may determine whether the application(s) and/or application data is within one or more a pre-determined criteria (e.g., application quality, content, functionality, description, screenshot quality and orientation, etc.).

In operation, the application server 200 may be operable to receive, from a developer entity, such as, for example, the developer entity 110, a request for approving an application for release in an application store. The request may comprise application data and/or the application for which the approval is requested. In this regard, the communication subsystem 203 may receive and/or process the request.

The AMS 205, in response to the request, may determine whether the request corresponds to a particular developer entity. In an example embodiment of the disclosure, the request may comprise data and/or information relating to a developer entity. In this regard, the AMS 205 may initiate a search on a developer database, such as, for example, the developer database 202(a), to determine a particular entity associated with the request and/or the application subject to the request. In another example embodiment of the disclosure, the request may comprise data and/or information relating to a particular application (e.g., an existing application which, for example, is already available in the application store and the request comprises, for example, another version and/or release of the existing application and/or a fix and/or an update to the existing application, etc.). In this regard, the AMS 205 may initiate a search on an application database, such as, for example, the application database 202(b), to determine a particular application associated with the request and/or the application subject to the request. The AMS 205 may also initiate a search on the application database 202(b), to determine a particular developer entity associated with the request and/or the application subject to the request.

The AMS 205, in response to the request, determine various application approval criteria that may be applicable to the request and/or to the application subject to the request. The criteria may include application quality criteria, such as, for example user experience criteria (e.g., graphics, error-free operation, etc.), application upsell quality criteria (e.g., developer description, application description, application category, sample application screenshots, etc.), application content criteria (e.g., content approved for a particular category of an application) and/or application functionality criteria.

In an example embodiment of the disclosure, the AMS 205 may determine, based on, for example, the request and/or the application subject to the request, one or more application approval criteria and may request from the application approval module 225 to analyze and/or process all or some application data (e.g., that may be received as part of the request to approve an application for release in an application store) to determine whether the application meets one or more of the one or more application approval criteria. The AMS 205 may request from the application approval module 225 to analyze and/or process the application data separately with respect to each of the one or more application approval criteria and/or collectively for one or more of the one or more application approval criteria. For example, the AMS 205 may send one request to the application approval module 225 corresponding for each of the one or more application approval criteria (e.g., applicable to the request and/or the application subject to the request based on the determination by the AMS 205). In another example, the AMS 205 may send one request to the application approval module 225 for any combination of the one or more application approval criteria.

In an example embodiment of the disclosure, the AMS 205 may determine that the request comprises one or more sample application screenshots. Based on the determination, the AMS 205 may determine that one or more application upsell quality criteria apply, such as, for example, a sample application screenshot related criterion. In this regard, AMS 205 may request from the application approval module 225 for the application approval module to analyze and/or process the one or more sample application screenshots to determine whether the one or more sample application meet the application screenshot related criterion (e.g., whether the orientation of each of the one or more sample application screenshots is correct). In this regard, the application approval module 225 may request from the image processing module 215, for the image processing module 215 to analyze and/or process the one or more sample application screenshots (e.g., image(s) associated with the one or more sample application screenshots). One or more of the one or more sample application screenshots may be subject to one request (e.g., the request may comprise a request to evaluate just one sample application screenshot or more than one sample application screenshots).

The image processing module 215 may analyze and/or process a particular sample application screenshot by performing a variety of image processing techniques (e.g., image composition deviation, optical character recognition (OCR), facial recognition, visual search, etc.) on the particular sample application screenshot. In an example embodiment of the disclosure, the image processing module 215 may determine whether the particular sample application screenshot comprises text characters by, for example, performing an OCR. In this regard, the image processing module may perform an OCR on the particular sample application screenshot in its original orientation. If, for example, the image processing module 215 determines that no text may be found as a result of the OCR, the image processing module 215 may rotate the particular sample application screenshot by a predetermine number of degrees and may perform a subsequent OCR on the rotated sample application screenshot.

In an example embodiment of the disclosure, if the image processing module 215, for example, determines that the orientation of a sample application screenshot is incorrect (e.g., no text characters recognized, no faces recognized, etc.), the image processing module 215 may proceed to rotate the sample application screenshot by, for example, 90, 180 and 270 degrees, performing a subsequent image processing technique (e.g., OCR, face recognition, etc.) after each rotation until, for example, a correct orientation of the sample application screenshot is determined or until the rotation results in an original orientation of the sample application screenshot.

For example, if an initial image processing technique results in a determination that the original orientation of the sample application screenshot is incorrect, the image processing module 215 may rotate by, for example, 90 degrees, the sample application screenshot and may perform a subsequent image processing technique on the rotated (by 90 degrees) sample application screenshot. If, for example, the image processing module 215 determines that the rotated (by 90 degrees) sample application screenshot still has an incorrect orientation, the image processing module 215 may rotate the rotated (by 90 degrees) sample application screenshot by another 90 degrees (or the original sample applications screenshot by 180 degrees) and may perform another image processing technique on the rotated screenshot (by 180 degrees from the original orientation). If, for example, the image processing module 215 determines that the rotated (by 180 degrees from the original orientation) sample application screenshot still has an incorrect orientation, the image processing module 215 may perform another 90-degree rotation on the rated (by 180 degrees from the original orientation) sample application screenshot and perform another subsequent image processing technique on the rotated screenshot (by 270 degrees from the original orientation).

The image processing module 215 may, for example, determine that after three 90-degree rotations combined with one or more image processing techniques (as, for example, described above) resulted in a lack of determination of a correct screenshot orientation (e.g., no text characters recognized, no faces recognized, etc.). In an example embodiment of the disclosure, the image processing module 215 may send a notification to the application approval module 225 indicating that a correct screenshot orientation cannot be determined. In another example embodiment of the disclosure, the image processing module 215 may, for example, perform another sequence of one or more sample screenshot rotations combined with one or more the same and/or different image processing techniques. For example, the image processing module 215 may the same sequence of rotations (e.g., 90, 180, 270 degrees with respect to the original orientation) combined with different one or more image processing techniques and/or may perform a sequence of rotations (e.g., 45, 135, 225 degrees with respect to the original orientation) combined with the same image processing techniques as previously performed in combination with a sequence of rotation by 90, 180 and 270 degrees with respect to the original orientation.

It is to be understood that the number of rotations is not limited to any particular number. For example, the image processing module may only rote a sample application screenshot once or it may rotate the sample application screenshot by any number of times (e.g., two, three, four, etc.). Also, it is to be understood that the number of degrees corresponding to each rotation is not limited to any particular number of degrees. For example, the number of degrees corresponding to a rotation may be, for example: 1, 5, 30, 45, 90, etc. Furthermore, the number of degrees corresponding to each rotation may be expressed as fraction of a degree e.g., ½, ¼, etc. Additionally, the number of degrees corresponding to each rotation, for example, in a sequence or rotations may not be the same. For example, the image processing module 215 may perform an initial image processing technique on a sample application screenshot and may determine that the orientation of the sample application screenshot is incorrect. The image processing module 215 may then rotate the sample applications screenshot by, for example, 35 degrees, may perform a subsequent image processing technique and may determine that the orientation of the rotated (by 35 degrees) sample application screenshot is still incorrect. The image processing module 215 may then rotate the rotated (by 35 degrees) sample application screenshot by, for example, 90 degrees and may perform a subsequent image processing technique on the rotated (by 125 degrees from the original orientation) sample application screenshot.

In an example embodiment of the disclosure, the number of rotations, the number of degrees corresponding to each rotation and/or a particular image processing technique may be specified and/or pre-determined by the application approval module 225 and/or may be sent to the image processing module 215 as a part of the request to determine a correct orientation of a sample application screenshot. In another embodiment of the disclosure, the number of rotations, the number of degrees corresponding to each rotation and/or a particular image processing technique may be determined by the image processing module 215 through rotation logic. For example, the request to determine a correct orientation, received from the application approval module 225, may comprise data and/or information indicative of, for example, a type and/or a category of an application (e.g., game, personal application, business application, social networking application, etc.). For example, a sample screenshot of a game type application may be more likely to include faces and/or a sample screenshot of a personal type application (e.g., personal diary, etc.) may be more likely to include text characters. Based on, for example, the type and/or category of the application, the image processing module 215 may determine that, for example, in determining a correct orientation of the sample application screenshot, a face recognition technique may be performed for a game type application and/or an OCR technique may be performed for a personal type application.

In an example embodiment of the disclosure, the image processing module 215 may perform one or more image processing techniques with respect to a particular sample application screenshot. For example, the image processing module 215 may perform a first image processing technique (e.g., OCR, face recognition, etc.) that may also be combined with, for example, image rotation. The image processing module 215 may then perform a second image processing technique (e.g., OCR, face recognition, etc.). In an example embodiment of the disclosure, the image processing module 215 may perform any number of subsequent image processing techniques. For example, the first image processing technique may or may not be different from the second image processing technique and/or any subsequent image processing technique.

For example, the image processing module 215 may first perform, for example, an OCR on the sample application screenshot combined with, for example, 90, 180 and 270 degree image rotations, and then the image processing module 215 may perform, for example, face recognition on the sample application screenshot combined with, for example, 90, 180 and 270 degree image rotations.

In another example embodiment of the disclosure, the image processing module 215 may first perform, for example, an OCR on the sample application screenshot combined with, for example 90, 180 and 270 degree image rotations, and then the image processing module 215 may perform, for example, another OCR on the sample application screenshot combined with, for example, 45, 135 and 225 degree image rotations.

In yet another example embodiment of the disclosure, the image processing module 215 may perform, for example, an OCR on the sample application screenshot, rotate the sample application screenshot by, for example, 90 degrees, perform face recognition on the rotated (by 90 degrees) sample application screenshot. The image processing module 215 may rotate the rotated (by 90 degrees) sample application screenshot by a pre-defined number of degrees (e.g., 45, 90, etc.) and may perform another image processing technique (e.g., OCR, face recognition, etc.). The image processing module 215 may continue the rotation and image processing technique combination until a correct image orientation is determined and/or unit a pre-defined condition (e.g., pre-defined number of rotations, pre-defined number of degrees of rotation, pre-defined number of image processing techniques, etc.) and/or any combination of the pre-defined conditions occurs.

In another example embodiment of the disclosure, the image processing module 215 may perform one or more image processing techniques for each image rotation. For example, the image processing module may first perform an OCR on a sample application screenshot and may, for example, determine that not text characters were recognized. Then, the image processing module 215 may perform face recognition of the sample application screenshot and may, for example, determine that no faces were recognized The present disclosure is not limited to any particular image processing technique or any particular sequence of performing one or more various image processing techniques (or combinations thereof). Furthermore, the present disclosure is not limited to any particular pre-determined, pre-defined and/or otherwise determined image rotation sequence(s) or their combinations with one or more image processing techniques (or sequences of performing image processing techniques).

The image processing module 215 may send, to the application approval module 225, a message comprising data and/or information indicative of the result of the analysis and/or processing of a particular sample application screenshot. In an example embodiment of the disclosure, the message may comprise data and/or information indicative of, for example whether a determination of a correct screenshot orientation could have been made. In this regard the data and/or information may indicate that one or more image processing techniques were performed and that, for example, based on one or more of the one or more image processing techniques a correct orientation has been determined. In another example embodiment of the disclosure, the message may comprise data and/or information indicative of a correct screenshot orientation. The correct orientation may comprise an original orientation of a particular sample application screenshot or a different orientation (e.g., orientation in which the particular sample application screenshot may be rotated by a pre-determined number of degrees (e.g., 5. 90, 95, 180, 270, etc.) with respect to the original orientation). The application approval module 225, based on, for example, the message received from the image processing may determine that, for example the criterion relating to sample application screenshots may or may not be met by the application.

The application approval module 225 may communicate with the AMS 205. In this regard, the application approval module 225 may send to the AMS 205 data and/or information indicative of whether one or more application approval criteria may be met (e.g., the one or more application approval criteria that where the subject of a request from the AMS 205 to the application approval module 225).

The AMS 205 may determine, based on, for example, the data and/or information received from the application approval module 225 whether an application may be released to the application store. The AMS 205 may request from the communication subsystem 203 for the communication subsystem 203 to send, to the developer entity 110, a notification, which may comprise application receipt data. The application receipt data may comprise data and/or information indicative of whether the application may be released to the application store.

In an example embodiment of the disclosure, the application receipt data may comprise data and/or information indicative of whether one or more of the one or more sample application screenshots (e.g., submitted to the application server 200 by the developer entity as a part of the request for an approval of the application for release to the application store) has a correct screenshot orientation. In an example embodiment of disclose, the data and/or information may relate to sample application screenshots that may have, for example, a correct, an incorrect orientation and/or an undetermined orientation. For example, the data and/or information may relate only to sample application screenshots that have an incorrect and/or undetermined orientation (e.g., the application server 200 may have been unable to confirm and/or determine a correct screenshot orientation).

In an example embodiment of the disclosure, the application receipt data may comprise data and/or information comprising a request for confirmation of an orientation of a sample application screenshot. For example, when the AMS 205 (and/or the image processing module 205) may not be able to determine a correct sample screenshot orientation, the AMS 205 may request from the communication subsystem 203 for the communication subsystem 203 to send a request to a developer entity associated with the application. The request may comprise a sample application screenshot having an original orientation (e.g., the orientation submitted by the developer entity with a request to approve the application for release in an application store).

The request may further comprise data and/or information that may allow the developer entity to manually and/or automatically confirm that the original orientation of the sample application screenshot is correct and/or to adjust the orientation of the sample applications screenshot if the original orientation is incorrect. The manual and/or automatic method may include, for example, one or more interactive hyperlink that when activated may be associated with a pre-defined action, such as, for example, sending a response message (e.g., a pre-formatted e-mail, etc.) to the application server 200 confirming that the original screenshot orientation is correct and/or requesting an adjustment (e.g., by a pre-defined number of degrees) of the orientation of the sample application screenshot.

Example hyperlinks may include an "accept/confirm" link that confirms that the original orientation is correct, default rotation links, such as, for example, "rotate by 90 degrees," "rotate by 180 degrees" and/or "rotate by 270 degrees" and/or a "cancellation" link that request a removal of the sample application screenshot (e.g., the screenshot may no longer be available for viewing in an applications store upon processing of the removal).

In an example embodiment of the disclosure, different application receipt delivery methods may be utilized to communicate with the developer entity. For example, the communication subsystem 203 may, based on, for example, a request from the AMS 205, send, to the developer entity, an e-mail message (e.g., to an e-mail address associated with the developer entity which may be retried from, for example, the developer database 202(*a*)) and/or another message that may be received and/or retrieved by the developer entity (e.g., a message in an application that may support communication between the developer entity and the application server 200, through, for example, an API and/or on-line (e.g., web browser) interface).

The components of the application server 200, such as for example, the main processor 201, the memory 202, the communication subsystem 203, the developer registration subsystem 204, and/or the AMS 205 may be implemented in an integrated or a distributed system. An integrated system may be implemented, for example, on one computer, server, machine or device, where the integrated system may be configured to perform some or all of the functions, features and/or operations of the main processor 201, the memory 202, the communication subsystem 203, the developer registration subsystem 204, and/or the AMS 205 as described herein. A distributed system may be implemented with multiple components (e.g., computers, servers, machines and/or devices), where each of the multiple components may be configured to perform some or all of the functions, features and/or operations of the main processor 201, the memory 202, the communication subsystem 203, the developer registration subsystem 204, and/or the AMS 205 as described herein. Each function, feature and/or operation may be implemented on one or more of the components of the distributed system. For example, a specific feature, function and/or operation may be implemented on one component of the distributed system or it may be implemented across multiple components of the distributed system.

Figure 3B:
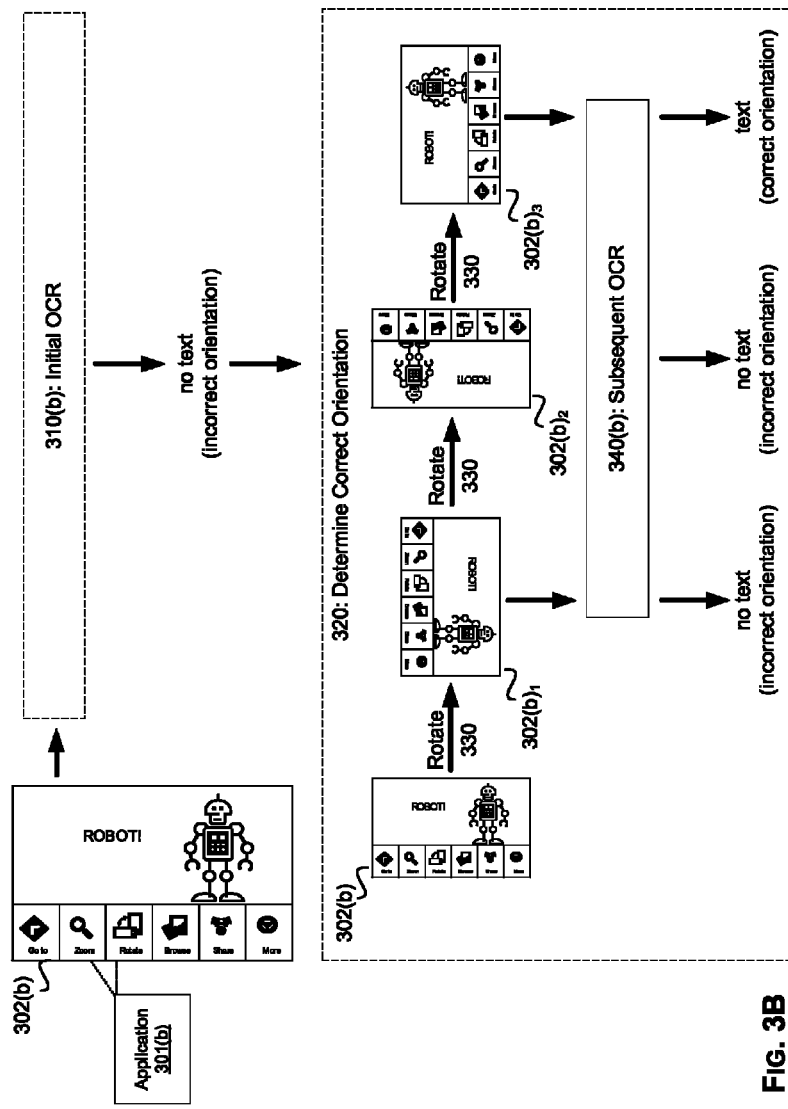

FIG. 3A and FIG. 3B are block diagrams of an example process of screenshot orientation detection, in accordance with an example embodiment of the disclosure. Referring to FIG. 3A, there is shown an application 301(*a*), an original sample application screenshot 302(*a*) and a rotated sample application screenshot 302(*a*)$_1$, 302(*a*)$_2$, and 302(*a*)$_3$. Referring to FIG. 3B, there is shown an application 301(*b*), an original sample application screenshot 302(*a*), a rotated sample application screenshot 302(*b*)$_1$, 302(*b*)$_2$, and 302(*a*)$_3$.

The application 301(*a*) and/or 301(*b*) may comprise data that may be processed by an application server such as, for example, the application server 200 and/or by an electronic device on which the application is intended to be installed, used and/or otherwise interacted with by a user of the electronic device. For example, the application 301(*a*) and/or 301(*b*) may be a software program (e.g., game, personal application, business application, social networking application, etc.) that may be installed on an electronic device and may be accessed and/or interacted with by a user of the electronic device. The application 301(*a*) and/or 301(*b*) may comprise data and/or information that may be intended, for example, only for the application server 120, only for the electronic device and/or both for the application server 120 and the electronic device. For example, the application 301(*a*) and/or 301(*b*) may comprise data and/or information intended for the application server 120 that may enable the application server 120 to evaluate the application before the application may be released by the application server 200 to an application store.

In an example embodiment of the disclosure, when, an application is submitted by a developer entity, such as, for example, the developer entity 110, to an application server, such as, for example, the application server 120, for release in an application store, the application server 120 may analyze and/or process the application and/or application data to determine whether the application and/or the application data may comprise one or more sample application screenshots, such as, for example, the original sample application screenshot 302(a) and/or 302(b).

The application server 120 may, for each sample application screenshot, determine whether the sample application screenshot has a correct orientation. In an example embodiment of the disclosure, the application server 120 may determine that for example, the orientation of the sample application screenshot (e.g., 302(a) and/or 302(b)) is incorrect. In this regard, the application server 120 may determine the correct orientation of the sample application screenshot.

Referring to FIG. 3A, the application server 120 may, in task 310(a), perform an initial face recognition on the original sample application screenshot 302(a). In an example embodiment of the disclosure, the application server 120 may determine, based on, for example, the initial face recognition 310(a) that the orientation of the original sample application screenshot 302(a) is incorrect.

Referring to FIG. 3B, the application server 120 may, in task 310(b), perform an optical character recognition (OCR) on the original sample application screenshot 302(b). In an example embodiment of the disclosure, the application server 120 may determine, based on, for example, the initial OCR 310(b) that the orientation of the original sample application screenshot 302(b) is incorrect.

Referring to FIG. 3A and FIG. 3B, the application server 120 may, in task 320, determine a correct orientation, respectively, for the original sample application screenshot 302(a) and/or 302(b).

The application server 120, in task 330, may rotate the original sample application screenshot 302(a) and/or 302(b) by, for example, 90 degrees clockwise, to obtain, for example, a rotated sample application screenshot $302(a)_1$ and/or $302(b)_1$, respectively.

Referring to FIG. 3A, the application server 120 may, in task 340(a) perform a subsequent face recognition on the rotated sample application screenshot $302(a)_1$. Based on the subsequent face recognition 340(a) the application server 120 may determine that no faces may be identified in the rotated sample application screenshot $302(a)_1$ and may determine that the orientation of the rotated sample application screenshot $302(a)_1$ is incorrect. The application server 120 may repeat tasks 330 and 340(a) until, for example, a face can be identified in, for example, the rotated sample application screenshot $302(a)_3$, from the subsequent face recognition 340(a).

Referring to FIG. 3B, the application server 120 may, in task 3430(b) perform a subsequent OCR on the rotated sample application screenshot $302(b)_1$. Based on the subsequent OCR 340(b) the application server 120 may determine that no text may be identified in the rotated sample application screenshot $302(b)_1$ and may determine that the orientation of the rotated sample application screenshot $302(b)_1$ is incorrect. The application server 120 may repeat tasks 330 and 340(b) until, for example, text can be identified in, for example, the rotated sample application screenshot $302(b)_3$, from the subsequent OCR 340(b).

Figure 4:
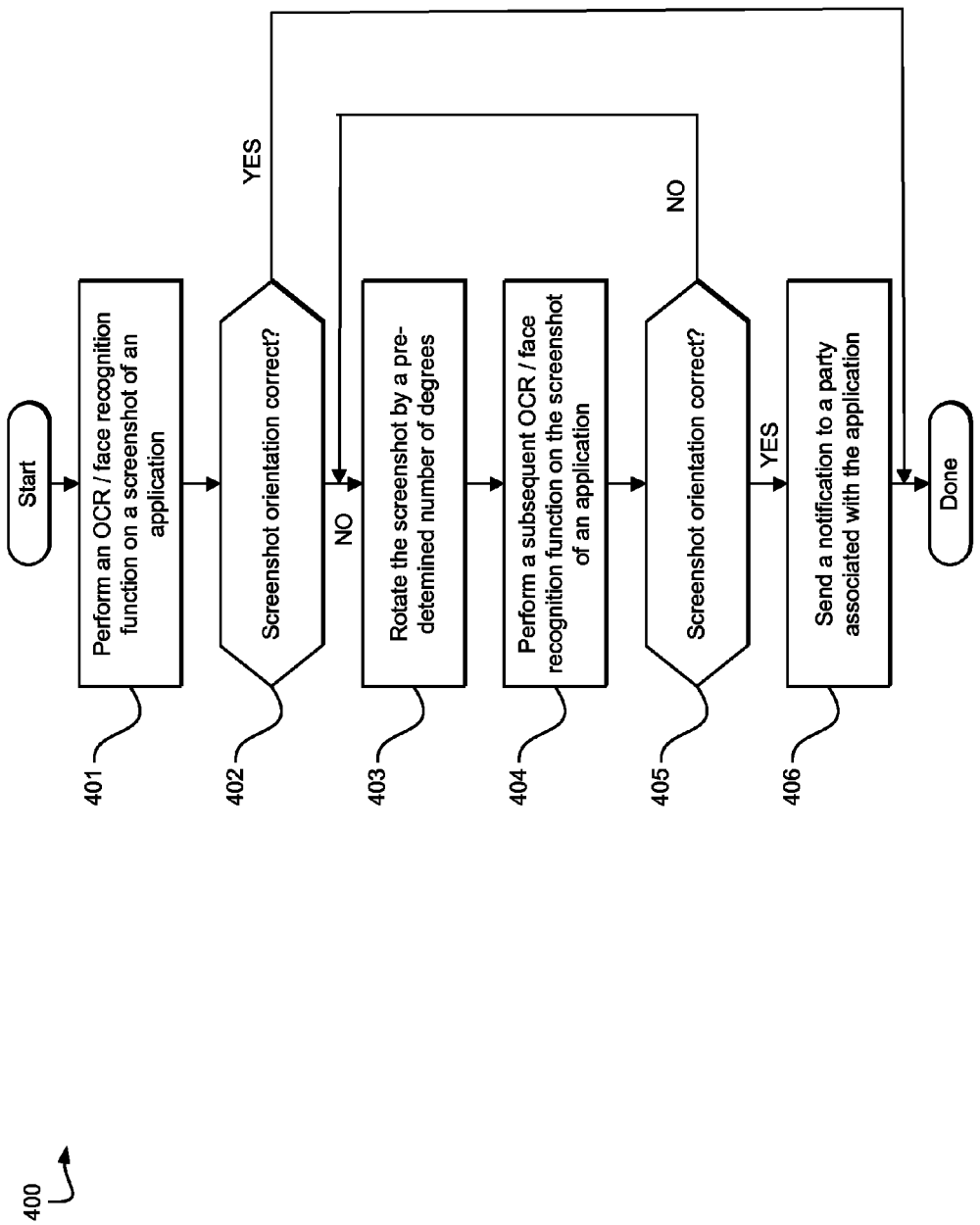
FIG. 4 is a flow diagram of example steps of a method for screenshot orientation detection, in accordance with an example embodiment of the disclosure.

FIG. 4 is a flow diagram of example steps of a method for screenshot orientation detection, in accordance with an example embodiment of the disclosure. Referring to FIG. 4, an example method 400 is shown comprising a plurality of example steps for screenshot orientation detection.

In example step 401, an optical character recognition (OCR) and/or face recognition function may be performed on a screenshot of an application. In this regard, the screenshot may be analyzed for text and/or facial feature content, respectively.

In example step 402, a determination may be made whether an orientation of the screenshot is correct. The determination may be based on, for example, the OCR and/or face recognition function performed in the example step 401. In this regard if text and/or facial feature content was identified in the example step 401, the screenshot orientation may be determined to be correct. If, for example, no text or facial feature content was identified in the example step 401, the screenshot orientation may be determined to be incorrect. In an event the orientation of the screenshot may be correct, the example steps end. In an event the orientation of the screenshot may not be correct the example steps continue at the example step 403.

In example step 403, the screenshot may be rotated by a pre-determined number of degrees. For example, the screenshot may be rotated by 90 degrees clockwise or counterclockwise.

In example step 404, a subsequent OCR and/or face recognition function may be performed on the rotated screenshot (e.g., the screenshot rotated by a pre-determined number of degrees in the example step 403). The subsequent OCR and/or face recognition function may be performed similarly to the initial OCR and/or face recognition function as described with respect to the example step 401.

In example step 405, a determination may be made whether an orientation of the rotated screenshot is correct. The determination may proceed as in the example step 402. In an event the orientation of the screenshot may be correct, the example steps continue at the example step 406.

In an event the orientation of the screenshot may not be correct the example steps return to the example step 403. The example steps 403 through 405 may continue until, for example, a predetermined number of rotations (e.g., as in the example step 403) has been performed and/or until an occurrence of another pre-defined criterion.

In example step 406, a notification may be sent to a party associated with the application, such as, for example, a developer entity (e.g., developer entity 110). The notification may comprise data and/or information indicative whether the screenshot orientation was determined to be correct, whether the screenshot orientation may need to be adjusted by the party (e.g., through a manual and/or an automatic method that may be provided as part of the notification) and/or whether the screenshot orientation was automatically adjusted based on the determination that the originally submitted screenshot orientation was incorrect, in which case, the notification may also include, for example, a method to reverse the adjustment.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for screenshot orientation detection.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein.

Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   in a computer:
      performing an initial image processing technique on a screenshot of an application, wherein the screenshot comprises a screenshot orientation;
      determining whether the screenshot orientation is correct based on the initial image processing technique; and
      if the screenshot orientation is not correct, determining a correct screenshot orientation by:
         rotating the screenshot to obtain a rotated screenshot, wherein the rotated screenshot comprises a rotated screenshot orientation;
         performing a subsequent image processing technique on the rotated screenshot;
         determining whether the rotated screenshot orientation is correct based on the subsequent image processing technique;
         if the rotated screenshot is correct, determining the correct screenshot orientation as the rotated screenshot orientation; and
         sending a notification to a developer entity associated with the application which indicates whether the screenshot has a correct orientation or an incorrect orientation such that the notification prevents the application from being approved for release when the screenshot has the incorrect orientation.

2. The method of claim 1, wherein rotating is by a predetermined number of degrees.

3. The method of claim 1, wherein the initial image processing technique is selected from the group consisting of: an OCR technique and a face recognition technique.

4. The method of claim 1, wherein the subsequent image processing technique is selected from the group consisting of: an OCR technique and a face recognition technique.

5. The method of claim 1, wherein the initial image processing technique is the same as the subsequent image processing technique.

6. The method of claim 1, further comprising providing an option to the developer entity to select the correct screenshot orientation for the application.

7. A method, comprising:
   in a computer:
      receiving a request, from a developer entity, to release an application to an application store, wherein the request comprises a screenshot of the application and wherein the screenshot comprises a screenshot orientation;
      performing an initial image processing technique on the screenshot;
      determining whether the screenshot orientation is correct based on the initial image processing technique;
      if the screenshot orientation is not correct, determining a correct screenshot orientation by:
         rotating the screenshot to obtain a rotated screenshot, wherein the rotated screenshot comprises a rotated screenshot orientation;
         performing a subsequent image processing technique on the rotated screenshot;
         determining whether the rotated screenshot orientation is correct based on the subsequent image processing technique;
         if the rotated screenshot is correct, determining the correct screenshot orientation as the rotated screenshot orientation; and
         sending a notification to the developer entity associated with the application that the screenshot orientation is not correct and has been rotated, wherein the notification includes an option to reverse the rotation of the screenshot, and wherein the notification prevents the application from being approved for release when the screenshot has the incorrect orientation.

8. The method of claim 7, further comprising releasing the application to the application store with the correct screenshot orientation.

9. The method of claim 7, wherein the initial image processing technique is the same as the subsequent image processing technique.

10. The method of claim 8, wherein the initial image processing technique is the same as the subsequent image processing technique.

11. A system comprising:
    one or more processors, the one or more processors being operable to:
       receive a request, from a developer entity, to release an application to an application store, wherein the request comprises a screenshot of the application and wherein the screenshot comprises a screenshot orientation;
       perform an initial image processing technique on the screenshot;
       determine whether the screenshot orientation is correct based on the initial image processing technique;
       if the screenshot orientation is not correct, the one or more processors determine a correct screenshot orientation by, at least:
          rotating the screenshot to obtain a rotated screenshot, wherein the rotated screenshot comprises a rotated screenshot orientation;
          performing a subsequent image processing technique on the rotated screenshot;
          determining whether the rotated screenshot orientation is correct based on the subsequent image processing technique; and
          if the rotated screenshot is correct, determining the correct screenshot orientation as the rotated screenshot orientation; and sending a notification to a developer entity associated with the application which indicates whether the screenshot has a correct orientation or an incorrect orientation such that the notification prevents the application from being approved for release when the screenshot has the incorrect orientation.

12. The system of claim 11, wherein the rotating is by a predetermined number of degrees.

13. The system of claim 11, wherein the initial image processing technique is selected from the group consisting of: an OCR technique and a face recognition technique.

14. The system of claim 11, wherein the subsequent image processing technique is selected from the group consisting of: an OCR technique and a face recognition technique.

15. The system of claim 11, wherein the initial image processing technique is the same as the subsequent image processing technique.

16. The system of claim 11, wherein the one or more processors is operable to:
provide an option to the developer entity to select the correct screenshot orientation for the application.

\* \* \* \* \*